Aug. 17, 1948. C. A. KUNKLER 2,447,187
PARACHUTE
Filed Feb. 11, 1944 3 Sheets-Sheet 1
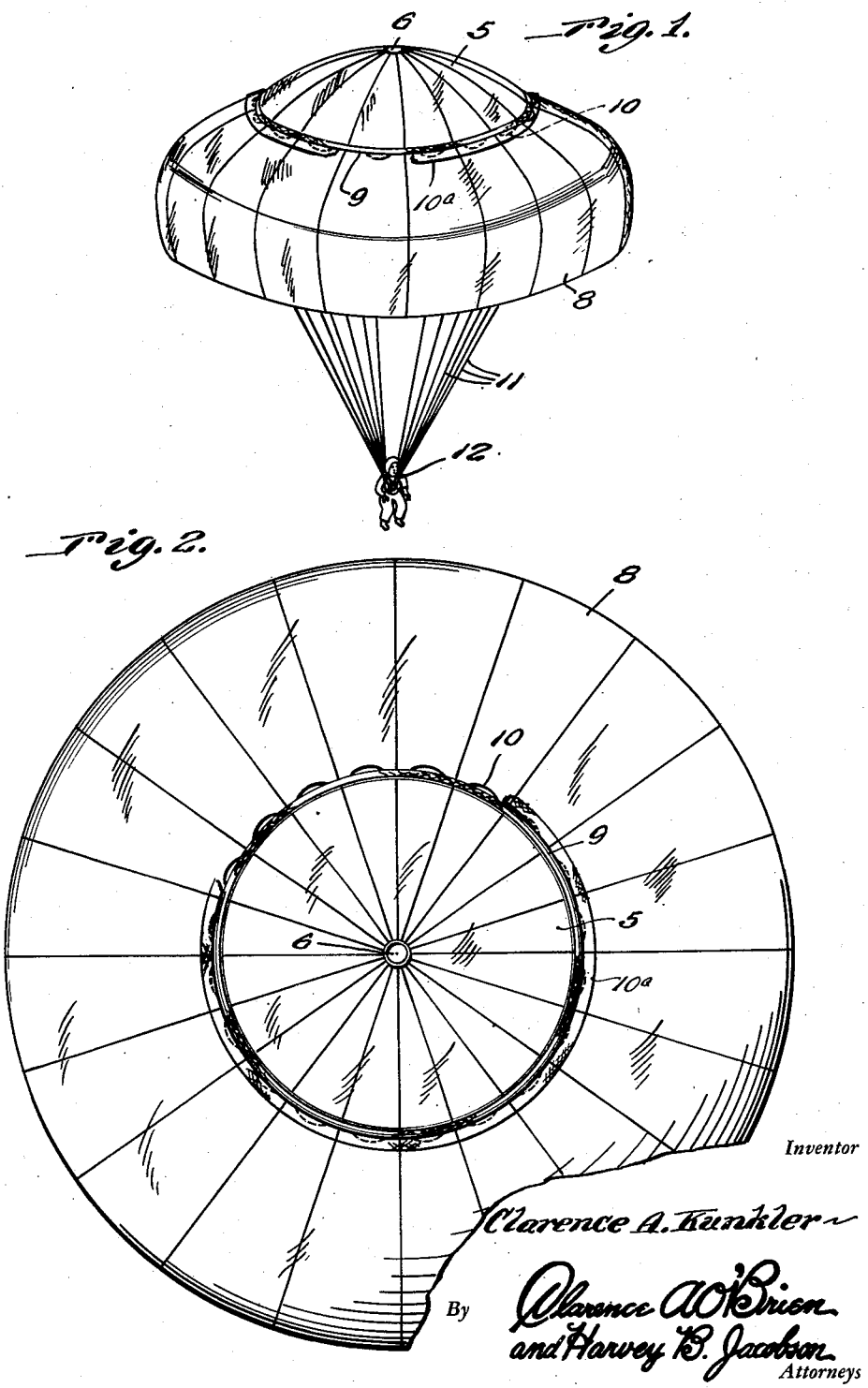

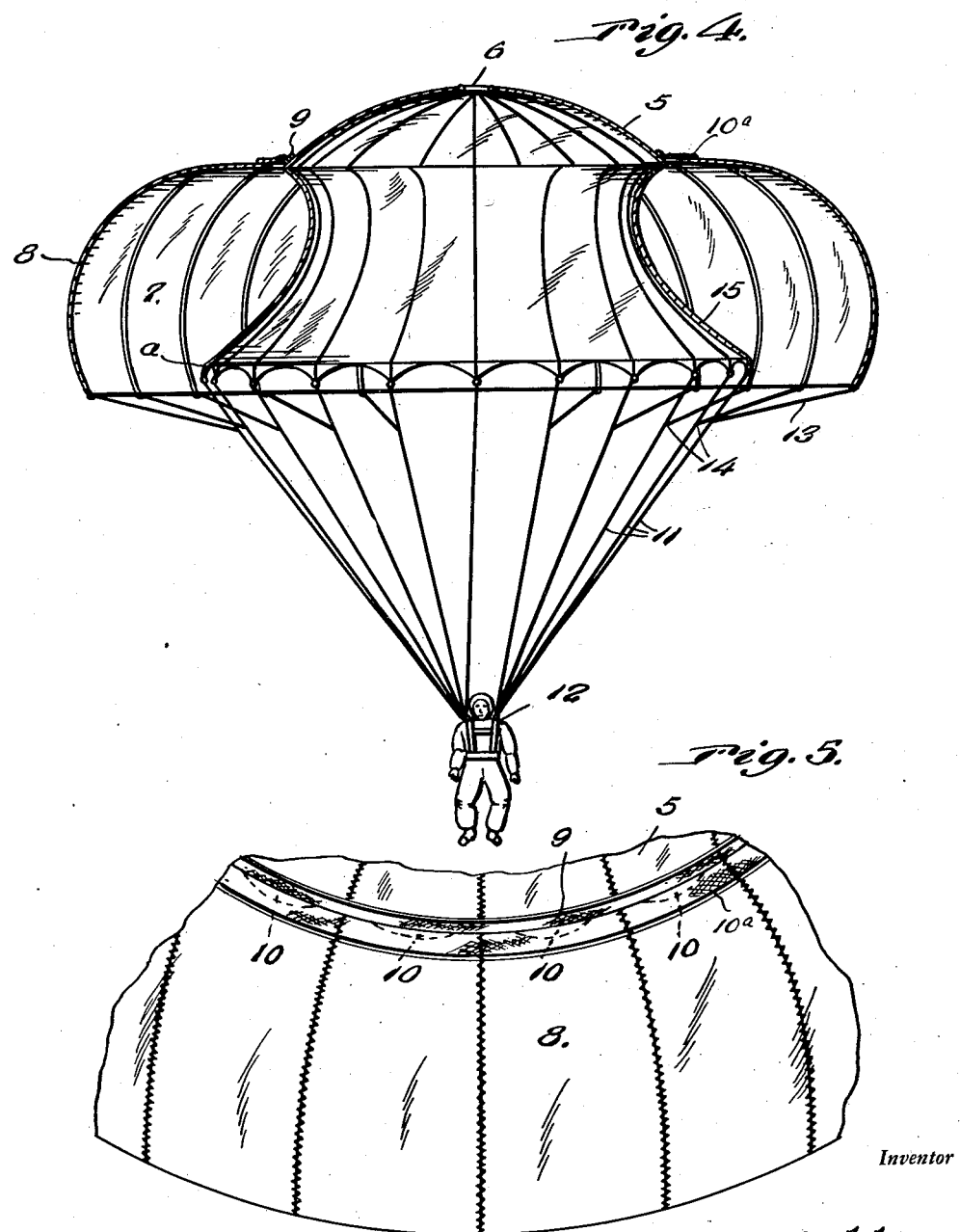

Patented Aug. 17, 1948

2,447,187

UNITED STATES PATENT OFFICE 2,447,187

PARACHUTE

Clarence A. Kunkler, Columbus, Ohio

Application February 11, 1944, Serial No. 522,001

1 Claim. (Cl. 244—142)

This invention relates to new and useful improvements in parachutes, the principal object being to provide a parachute which will afford a greater margin of safety than conventional parachutes due to the provision of a circumferential pocket and the lessening of the depth of the canopy with a view toward using a greater amount of air in breaking the fall of the parachute and its suspended load.

Another important object of the invention is to provide a parachute wherein the conventional size canopy is reduced in depth and the surplus built on to the outside of the remaining part to define a circumferential pocket which will broaden the radial dimension of the parachute and result in a greater utilization of air and the permission of shorter suspension lines, which, of course, will result in a slower descend and a greater margin of safety due to the shorter suspension lines.

Still another important object of the invention is to provide a parachute which without utilizing any appreciable additional amount of material affords a marked increase in the margin of safety over present-day parachutes.

Other objects and advantages of the invention will become apparent to the reader of the following description.

In the drawings:

Figure 1 is a perspective view of the improved parachute.

Figure 2 is a top plan view of the improved parachute.

Figure 4 is a vertical sectional view showing the parachute inflated.

Figure 5 is an enlarged fragmentary top plan view of the parachute.

Figure 3:
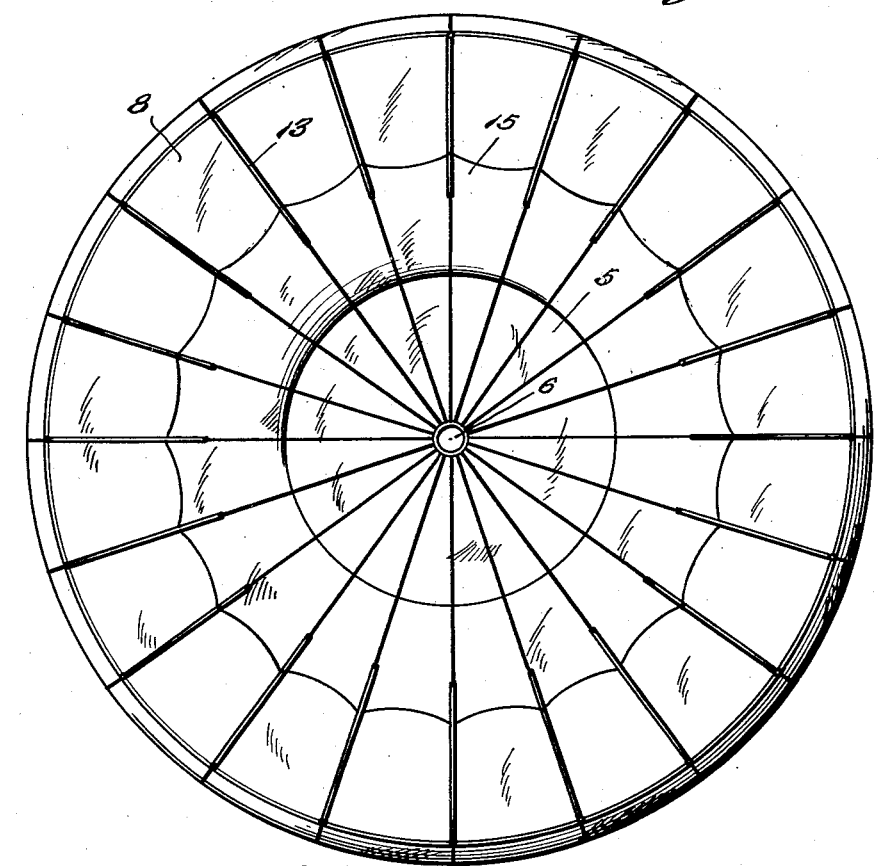
Figure 3 is a bottom plan view.
Figure 6:
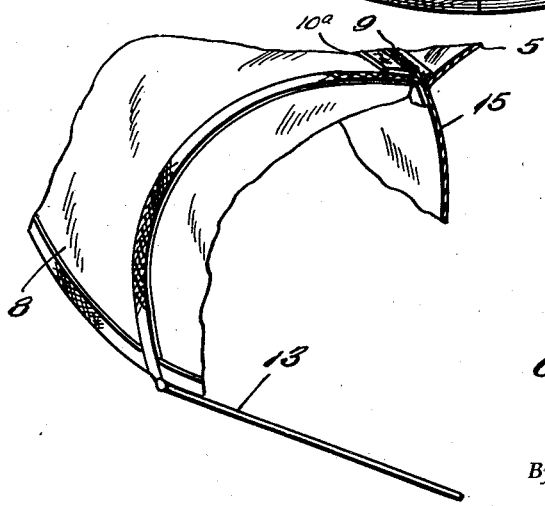
Figure 6 is a fragmentary enlarged perspective view.

Referring to the drawings wherein like numerals designate like parts, it can be seen that numeral 5 denotes a parachute canopy having an air escapement vent 6 at its top, and here it will be understood that the distance between this vent 6 and the edge a is reduced, that is, for a conventional 12-foot canopy, this measurement is reduced to about 8-feet and the material saved in this reduction is utilized in constructing a circumferential pocket 7. (See Figure 4.) This surplus material is used to provide a wall 8 circumscribing the lower portion of the canopy 5 and secured at its upper edge to a midpoint of the canopy 5 where, also, a circumferential extending webbing 9 is provided for reinforcing the structure.

At the webbing 9 are vents 10 through which air can escape from the pocket 7 and disposed over these vents 10 is a web 10a which defines a flap valve for regulating the escapement of air through the vents.

As is conventional, suspension lines 11 are provided, these lines extending in the usual way upwardly from one side of a body harness 12 along the panels of the canopy 5, over the top of the canopy and down the opposite side to connect to the opposite side of the harness 12. As is well known, these lines extend along the securing points between the usual panels of the canopy 5 and in a like manner guy lines 13 extend from the suspension lines 11 at the points 14 and through the connecting portions for the panels of the pocket wall 8.

Of course, the lower edge of the wall 8 and also the lower edge of the canopy 5 may be provided with webbing for the purpose of reinforcement.

The lower portion of the canopy 5, that is, the portion denoted by numeral 15 may be referred to as a flap and as can be seen in Figure 4, this flap will have a tendency to bulge inwardly when a parachute is fully inflated.

The parachute will take on a "pancake" appearance with its reduced depth and the increased diameter due to the pocket wall 8 and further in view of the shortening of the suspension lines 11. However, this construction will serve to reduce the speed of descent and the shorter suspension lines 11 which are now permitted in view of the greater diameter of the overall measurements of the parachute will materially increase the safety factor in landing.

It is to be understood that the fabric panels making up the chute proper as well as the outer wall of the pocket are of conventional construction and stitched in the usual manner, this not being shown in the drawings for the sake of conciseness. Further, the panels of this improved parachute may be constructed with the usual angularly-shaped sections of which most types of present-day parachutes are constructed.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

In a parachute construction, a canopy comprising a dome-like top, and an annular flap-like lower portion depending from said top, an annular flexible wall member circumscribing said canopy with an upper circumferential edge joined to the canopy at the juncture line of said top and lower portion and forming together with said lower portion a circumferential pocket around the canopy below said top and open at its bottom, a harness, guy lines connecting the bottom edge of said lower portion to the harness, and guy lines connecting the bottom edge of the wall member to the first mentioned guy lines, air vents in said wall member at said circumferential upper edge, and an annular flap extending around said circumferential edge for closing said vents and reinforcing the joint between said canopy and wall member.

CLARENCE A. KUNKLER.

REFERENCES CITED

The following references are of record in the file of this patent:

UNITED STATES PATENTS

| Number | Name | Date |
|---|---|---|
| 1,737,913 | Broadwick | Dec. 3, 1929 |
| 1,746,862 | Martin | Feb. 11, 1930 |
| 2,120,177 | Hart | June 7, 1938 |
| 2,127,895 | Tingle | Aug. 23, 1938 |